(12) United States Patent
Chen

(10) Patent No.: US 11,815,777 B2
(45) Date of Patent: Nov. 14, 2023

(54) ELECTRONICALLY-CONTROLLED AUTOMATIC LIGHT-SHADING DEVICE

(71) Applicant: Zhong-Yi Chen, Taichung (TW)

(72) Inventor: Zhong-Yi Chen, Taichung (TW)

( * ) Notice: Subject to any disclaimer, the term of this patent is extended or adjusted under 35 U.S.C. 154(b) by 0 days.

(21) Appl. No.: 17/862,518

(22) Filed: Jul. 12, 2022

(65) Prior Publication Data

US 2023/0029411 A1    Jan. 26, 2023

(30) Foreign Application Priority Data

Jul. 13, 2021  (TW) ................. 110125746

(51) Int. Cl.
*E06B 3/67* (2006.01)
*G02F 1/137* (2006.01)
*G02F 1/1333* (2006.01)
*G02F 1/1335* (2006.01)

(52) U.S. Cl.
CPC ........ *G02F 1/137* (2013.01); *G02F 1/133302* (2021.01); *G02F 1/133528* (2013.01); *G02F 2203/01* (2013.01)

(58) Field of Classification Search
CPC .................................................... E06B 3/6722
See application file for complete search history.

(56) References Cited

U.S. PATENT DOCUMENTS

2013/0278631 A1 * 10/2013 Border ................ G06Q 30/02
                                                                    345/633
2021/0103174 A1 * 4/2021 Ishii ................ B32B 17/10005

* cited by examiner

*Primary Examiner* — Edmond C Lau
(74) *Attorney, Agent, or Firm* — Locke Lord LLP; Tim Tingkang Xia

(57) ABSTRACT

Disclosed is an electronically-controlled automatic light-shading device, comprising a first glass substrate, a light-shading coating, a polarizing element and a second glass substrate. An image module and a photosensitive element adjacent thereto are embedded in the first glass substrate. The first glass substrate has a first surface on the opposite side to an external light source. The light-shielding coating is applied on the first surface. The polarizing element is disposed on the light-shielding coating. The second glass substrate has a second surface facing the first surface. A plurality of spacers in contact with the polarizing element are disposed on the second surface, and an optical fiber element is disposed in each spacer.

9 Claims, 4 Drawing Sheets

ELECTRONICALLY-CONTROLLED AUTOMATIC LIGHT-SHADING DEVICE

CROSS-REFERENCE TO RELATED APPLICATIONS

This application claim priority to TAIWAN application Numbered 110125746, filed Jul. 13, 2021, which is herein incorporated by reference in its' integrity.

BACKGROUND OF THE INVENTION

Field of the Invention

The present invention relates to a light-shading device, and more particularly, to an electronically-controlled automatic light-shading device.

Description of the Related Art

Due to global warming and climate change, extreme high temperatures often occur all over the world, so traditional sunshade items such as curtains are no longer sufficient.

Therefore, how to make the sunshade articles in buildings or transportation vehicles have both the functions of light-shading and maintaining the field of view is an important issue that the industry needs to think about when manufacturing related sunshade articles.

SUMMARY OF THE INVENTION

In view of this, an embodiment of the current invention provides an electronically-controlled automatic light-shading device, comprising a first glass substrate, a light-shading coating, a polarizing element and a second glass substrate. An image module and a photosensitive element adjacent thereto are embedded in the first glass substrate. The first glass substrate has a first surface on the opposite side to an external light source. The light-shielding coating is applied on the first surface. The polarizing element is disposed on the light-shielding coating. The second glass substrate has a second surface facing the first surface. A plurality of spacers in contact with the polarizing element are disposed on the second surface, and an optical fiber element is disposed in each spacer.

Another embodiment of the current invention provides the electronically-controlled automatic light-shading device, wherein electronically-controlled automatic light-shading device has a light-shading rate between 20% and 100%.

Yet another embodiment of the current invention provides the electronically-controlled automatic light-shading device, wherein the first glass substrate and the second glass substrate are flexible glass having a thickness less than 200 μm.

Yet another embodiment of the current invention provides the electronically-controlled automatic light-shading device, wherein the first glass substrate and the second glass substrate are flexible glass having a thickness less than 30 μm.

Yet another embodiment of the current invention provides the electronically-controlled automatic light-shading device, wherein the plurality of spacers are arranged in a continuous pattern composed of a plurality of polygons.

Yet another embodiment of the current invention provides the electronically-controlled automatic light-shading device, wherein each edge of each polygon serves as a light-guiding area of the optical fiber element.

Yet another embodiment of the current invention provides the electronically-controlled automatic light-shading device, wherein an area enclosed by edges of each polygon serves as a polarizing area.

Another embodiment of the current invention provides the electronically-controlled automatic light-shading device, wherein the electronically-controlled automatic light-shading device is connected with a control module, and wherein the control module includes a power supply and a microcontroller.

Another embodiment of the current invention provides the electronically-controlled automatic light-shading device, wherein the microcontroller communicates with the image module and the photosensitive element, and controls the polarizing element.

DESCRIPTION OF THE PREFERRED EMBODIMENTS

Figure 1:
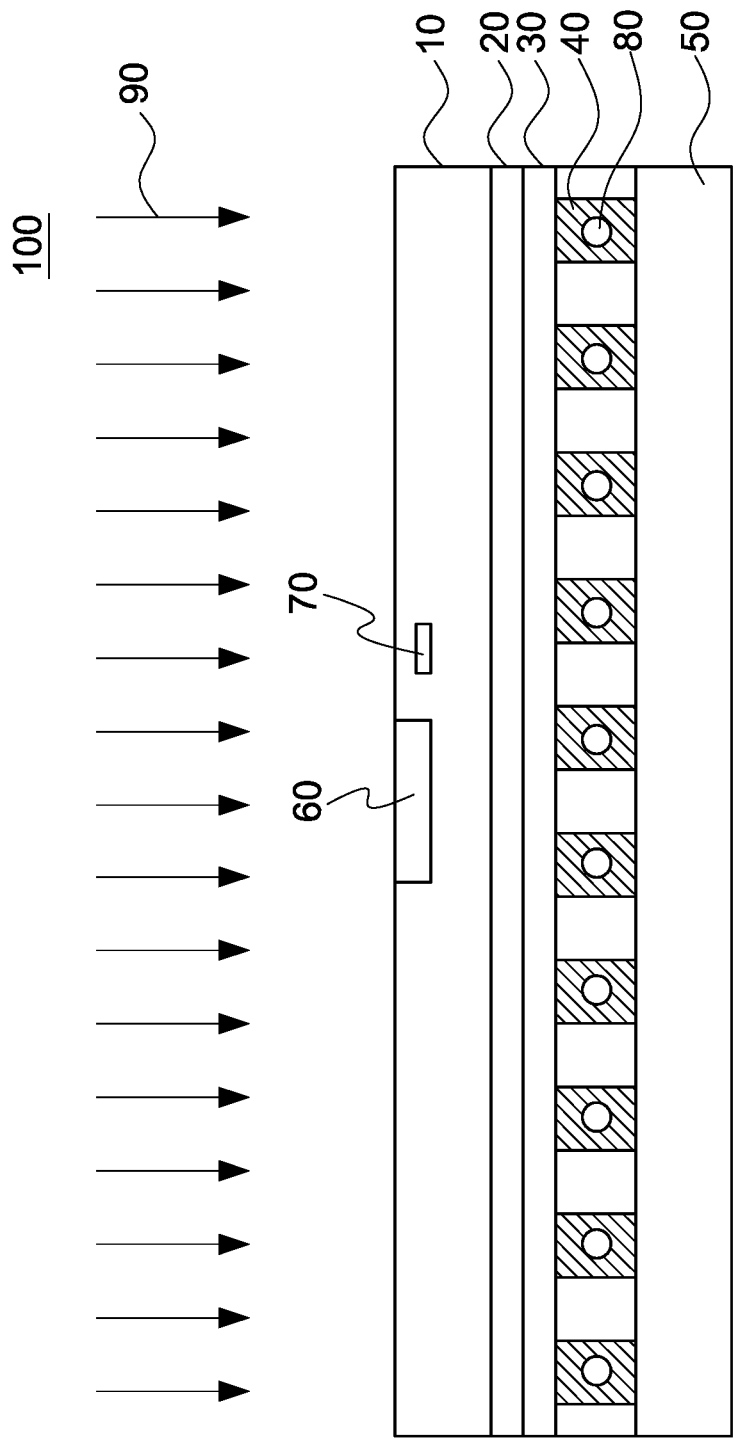
FIG. 1 is a cross-sectional view of an electronically-controlled automatic light-shading device according to an embodiment of the present invention.

First of all, please refer to FIG. 1 that is a cross-sectional view of an electronically-controlled automatic light-shading device according to an embodiment of the present invention.

As shown in FIG. 1, the electronically-controlled automatic light-shading device 100 includes a first glass substrate 10, a light-shading coating 20, a polarizing element 30 and a second glass substrate 50.

The electronically-controlled automatic light-shading device 100 further includes an image module 60 and a photosensitive element 70 that are adjacent to each other. The image module 60 and the photosensitive element 70 are embedded in the first glass substrate 10. In this embodiment, the image module 60 is a miniature lens, micro lens, or lens. In embodiments of the present invention, the image module that is addressed earlier or later is a miniature lens, micro lens, or lens.

The glass substrate 10 has a first surface on the side opposite to an external light source 90, and the first surface is the inner surface. The light-shielding coating 20 is formed on the first surface. The polarizing element 30 is arranged on the light-shielding coating 20. In this embodiment, the polarizing element 30 is a polarizing plate.

The electronically-controlled automatic light-shading device 100 further includes a plurality of spacers 40, and the plurality of spacers 40 are disposed on the second surface of the second glass substrate 50. The second surface of the second glass substrate 50 faces the aforementioned first surface and physically contact with the polarizing element 30. An optical fiber element 80 disposed in each spacer 40.

In this embodiment, the light-shading rate of the electronically automatically controlled light-shading device 100 is 20%. In another embodiment, the light-shading rate of the electronically automatically controlled light-shading device 100 is 55%, 70% or 100%. In other embodiments, the light-shading rate of the electronically automatically controlled light-shading device 100 ranges between 20% and 100%. In this embodiment, both the first glass substrate 10 and the second glass substrate 50 are flexible glass, and the thickness for each one is less than 200 μm. In another embodiment, the first glass substrate 10 and the second glass substrate 50 are both flexible glass, and the thickness thereof is less than 30 μm. The flexible properties makes it very convenient to carry or install the ultra-thin glass substrates, such that the ultra-thin glass substrates can be applied in various fields. For example, it can be applied to glass curtains of buildings or glass such as windshields of vehicles to adjust the amount of external light sources such as sunlight entering the building or vehicle.

For example, when the electronically-controlled automatic light-shading device 100 is utilized in a vehicle, it can be attached to the inside of the front windshield of the car. On sunny days, the incident amount and incident angle of the external sunlight penetrating the electronically-controlled automatic light-shading device 100 are adjusted through the polarizing element 30, thereby controlling the brightness and preventing the eyes from direct sunlight. On cloudy days, the polarizing element 30 as well as the optical fiber embedded in the spacer that is conventionally used in the liquid crystal panel act, so as to increase the image brightness of the electronically-controlled automatic light-shading device 100 and enhance the clarity of the field of vision. In rainy days, the polarizing element 30 is used to adjust amount of the multiple incident light. Furthermore, the optical fiber embedded in the spacer that is conventionally used in the liquid crystal panel increases the image brightness of the electronically-controlled automatic light-shading device 100 and enhances the clarity of the field of vision. In addition, if the glass of the electronically controlled light-shading device 100 is broken in a car accident, and the electronically controlled light-shading device 100 is in failure and power-off state, the transmission axis of the polarizing element 30 remains parallel to the incident angle of the external light, and prevents the electronically-controlled automatic light-shading device 100 from blocking the line of sight of the rescuers.

As an example of the application of the electronically-controlled automatic light-shading device 100 in a building, the electronically-controlled automatic light-shading device 100 can be attached to the inside of the glass curtain of the building for adjusting light and heat insulation.

Figure 2:
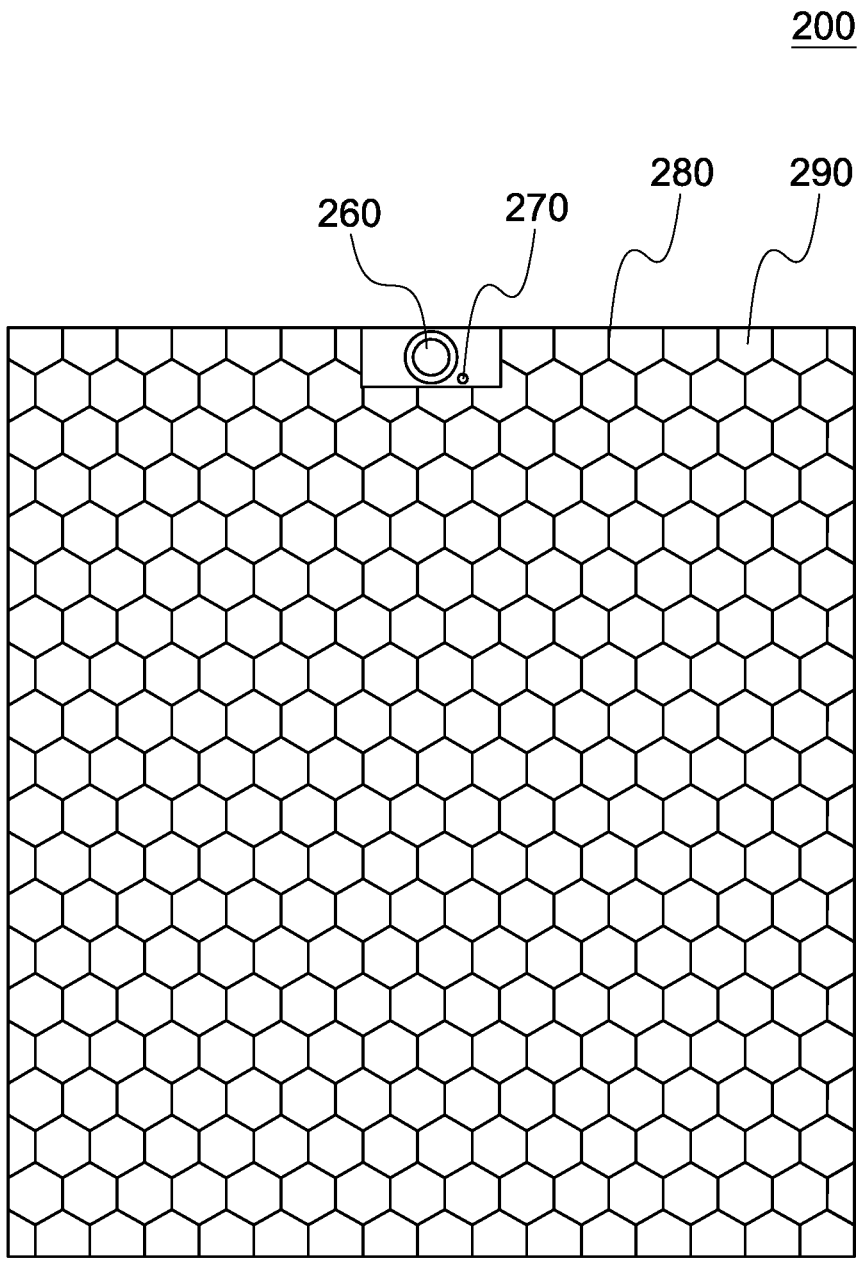
FIG. 2 is a front view of an electronically-controlled automatic light-shading device according to an embodiment of the present invention.

In addition, please refer to FIG. 2. FIG. 2 is a front view of an electronically-controlled automatic light-shading device according to an embodiment of the present invention. As shown on FIG. 2, when looking at the electronically-controlled automatic light-shading device 200 from the front, one can see the image modules 260 and the photosensitive elements 270 that are embedded adjacently in the front glass substrate, as well as a continuous pattern composed of a plurality of spacers. There is an optical fiber elements 280 in each spacer. In this embodiment, the image module 260 is a miniature lens. In this embodiment, a plurality of spacers containing the optical fiber element 280 inside form a plurality of hexagons, and the hexagons form a continuous pattern. Each side(or edge) of each hexagon is a spacer containing the optical fiber element 280. That is, every side of each hexagon serves as a light guide area of the optical fiber element 280. In addition, the area surrounded by the sides of each hexagon serve as the polarizing area 290 of the polarizing element. In other embodiments, the plurality of spacers can also compose a plurality of other polygons with different shapes, such that they form a continuous pattern. For other components or structures of the electronically-controlled automatic light-shading device 200, please refer to the description of FIG. 1, which will not be repeated again.

Figure 3:
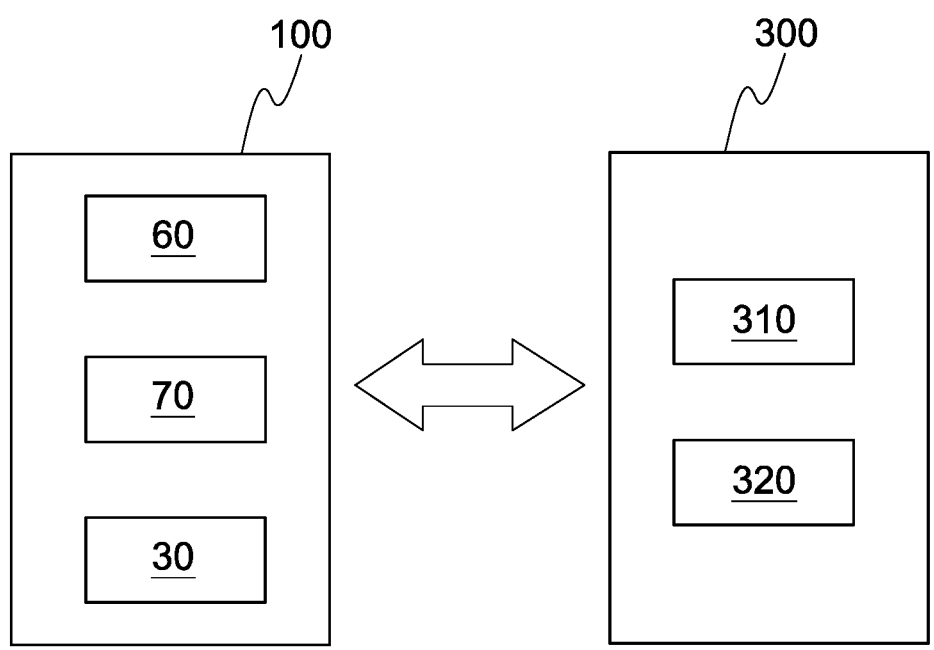
FIG. 3 is a block diagram illustrating an electronically-controlled automatic light-shading device according to an embodiment of the present invention.

Next, please refer to FIG. 3. FIG. 3 is a block diagram illustrating an electronically-controlled automatic light-shading device according to an embodiment of the present invention.

As shown in FIG. 1 and FIG. 3, the electronically-controlled automatic light-shading device 100 is further connected with a control module 300, and the control module 300 includes a power supply 310 and a microcontroller 320. The power supply 310 supplies power to the image module 60, the photosensitive element 70, the polarizing element 30 and the microcontroller 320.

In this embodiment, the microcontroller 320 communicates with the image module 60 and the photosensitive element 70 and controls the polarizing element 30. The electronically-controlled automatic light-shading device 100 is provided with an image module 60 and a photosensitive element 70, so as to determine the brightness and polarization value of the field of view. For example, through the image module 60 (e.g., a micro lens) and the photosensitive element 70 that are embedded in the first glass substrate 10, the information such as the amount and angle of incident light from the external light is transmitted to the microcontroller 320, and then the micro-controller 320 determines the brightness and polarization value of the field of view, thereby controlling the polarization element 30 and automatically adjusting the incident amount of external light. On sunny days, it is used to reduce the heat energy of direct sunlight and oblique sunlight. On cloudy or rainy days, the electronically automatically controlled light-shading device 100 can increase the amount of side light for visual beautification. In other embodiments, the electronically-controlled automatic light-shading device 100 or other functional devices can be used to adjust the indoor light and the temperature of the air conditioner by using data calculation and control. In other embodiments, the electronically-controlled automatic light-shading device 100 can be prefabricated into modules of different sizes. In doing so, consumers can assemble themselves easily at home; or construction workers can assemble conveniently at the construction site.

In other embodiments, the control module 300 of FIG. 3 can be connected to a wiper (not shown). When operating the wiper in rainy days, the electronically-controlled automatic light-shading device 100 applied to the automobile can be manually operated at the same time. As a result, the light-shading rate of the electronic-type automatic control light-shading device 100 can be controlled and ranges from 75%, 55% to 35% depending on the operating intensity of the wiper. In yet another embodiment, in the electronically-controlled automatic light-shading device 100 that is applied to a building, the control module 300 of FIG. 3 can be connected to a switch (not shown), and the electronically-controlled automatic module 300 can be manually operated by operating the switch. The electronic-type automatic control light-shading device 100 is controlled, and the light-shading rate thereof is controlled to be 0 or 100%.

Figure 4:
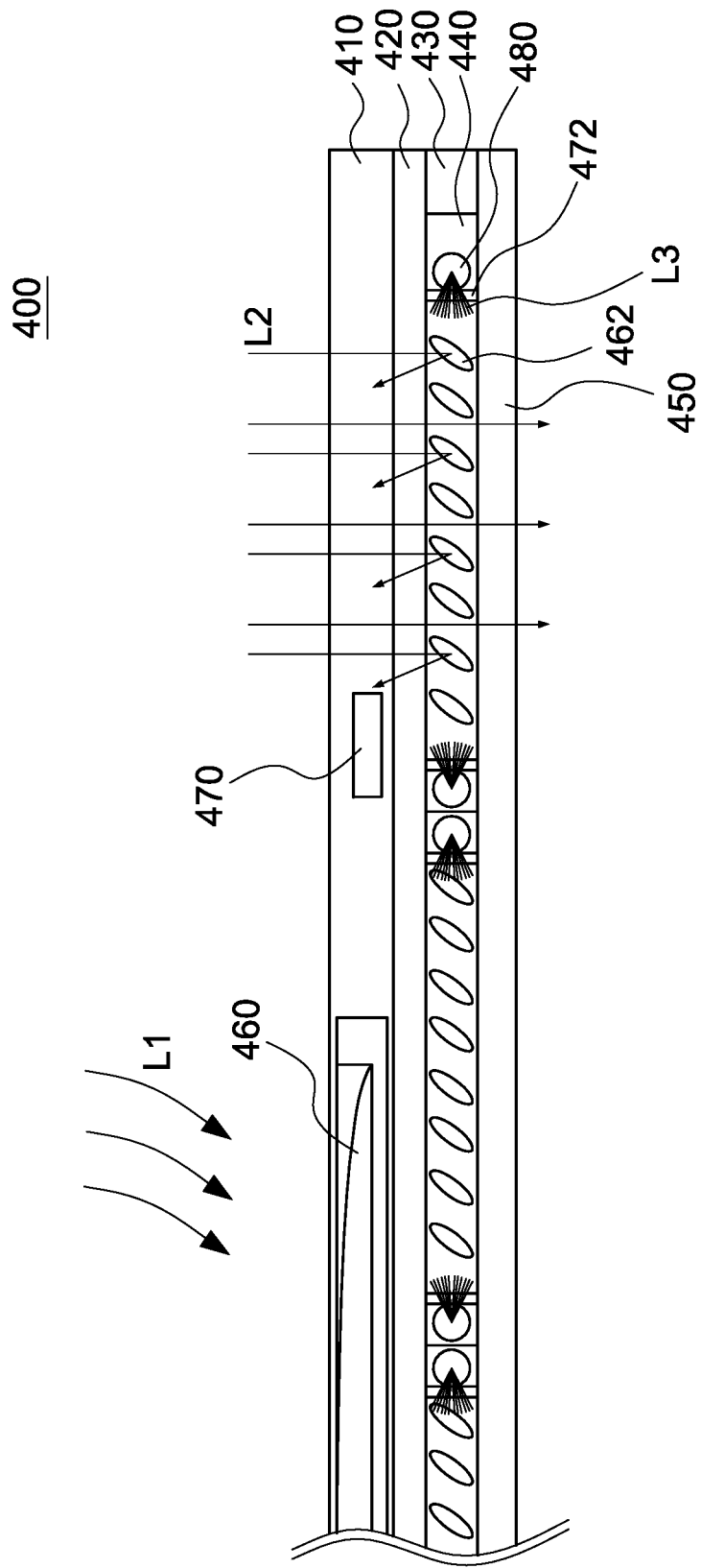
FIG. 4 is a cross-sectional view of an electronically-controlled automatic light-shading device according to another embodiment of the present invention.

Subsequently, please refer to FIG. 4. FIG. 4 is a cross-sectional view of an electronically-controlled automatic light-shading device according to another embodiment of the present invention. As shown in FIG4, the electronically-controlled automatic light-shading device 400 includes a front glass substrate 410, a light-shading coating 420, a sealant 430, a transparent sealant 440, an optical fiber 480, a transparent conductive layer 472, liquid crystal cell 462, a rear glass substrate 450, a lens 460, and a photosensitive component 470. The light-shading coating 420, the sealant 430, the transparent sealant 440, the optical fiber 480, the transparent conductive layer 472, and the liquid crystal cell 462 are sandwiched between the front glass substrate 410 and the rear glass substrate 450. The lens 460 and the photosensitive component 470 are embedded adjacently in the front glass substrate 410. The shading coating 420 is disposed between the front glass substrate 410 and the liquid crystal cell 462, and the shading coating 420 has a light-shading rate of 20%. The liquid crystal molecules of the liquid crystal cell 462 have a tilt angle of less than 45 degrees, and the liquid crystal cell 462 has a light-shading rate of 50%. Sunlight L1 inserts into the lens 460. The visible light passes through the glass substrate 410 and the light-shading coating 420 and are reflected by the liquid crystal molecules of the liquid crystal cell 462. The photosensitive component 470 can receive the light. In addition, the optical fiber 480 emits the light L3 that passes through the transparent conductive layer 472 to the liquid crystal cell 462. The transparent sealant 440 covers the optical fiber 480. In this embodiment, the electronically-controlled automatic light-shading device 400 has a light-shading rate of 70%.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An electronically-controlled automatic light-shading device, comprising:
   a first glass substrate embedded with an image module and a photosensitive element adjacent thereto, wherein the first glass substrate has a first surface on the opposite side to an external light source;
   a light-shielding coating on the first surface;
   a polarizing element on the light-shielding coating; and
   a second glass substrate having a second surface facing the first surface, wherein a plurality of spacers in contact with the polarizing element are disposed on the second surface, and an optical fiber element is disposed in each spacer.

2. The electronically-controlled automatic light-shading device of claim 1, wherein the electronically-controlled automatic light-shading device has a light-shading rate between 20% and 100%.

3. The electronically-controlled automatic light-shading device of claim 1, wherein the first glass substrate and the second glass substrate are flexible glass having a thickness less than 200 μm.

4. The electronically-controlled automatic light-shading device of claim 1, wherein the first glass substrate and the second glass substrate are flexible glass having a thickness less than 30 μm.

5. The electronically-controlled automatic light-shading device of claim 1, wherein the plurality of spacers are arranged in a continuous pattern composed of a plurality of polygons.

6. The electronically-controlled automatic light-shading device of claim 5, wherein each edge of each polygon serves as a light-guiding area of the optical fiber element.

7. The electronically-controlled automatic light-shading device of claim 6, wherein an area enclosed by edges of each polygon serves as a polarizing area.

8. The electronically-controlled automatic light-shading device of claim 1, wherein the electronically-controlled automatic light-shading device is connected with a control module, and wherein the control module includes a power supply and a microcontroller.

9. The electronically-controlled automatic light-shading device of claim 8, wherein the microcontroller communicates with the image module and the photosensitive element, and controls the polarizing element.

* * * * *